UNITED STATES PATENT OFFICE.

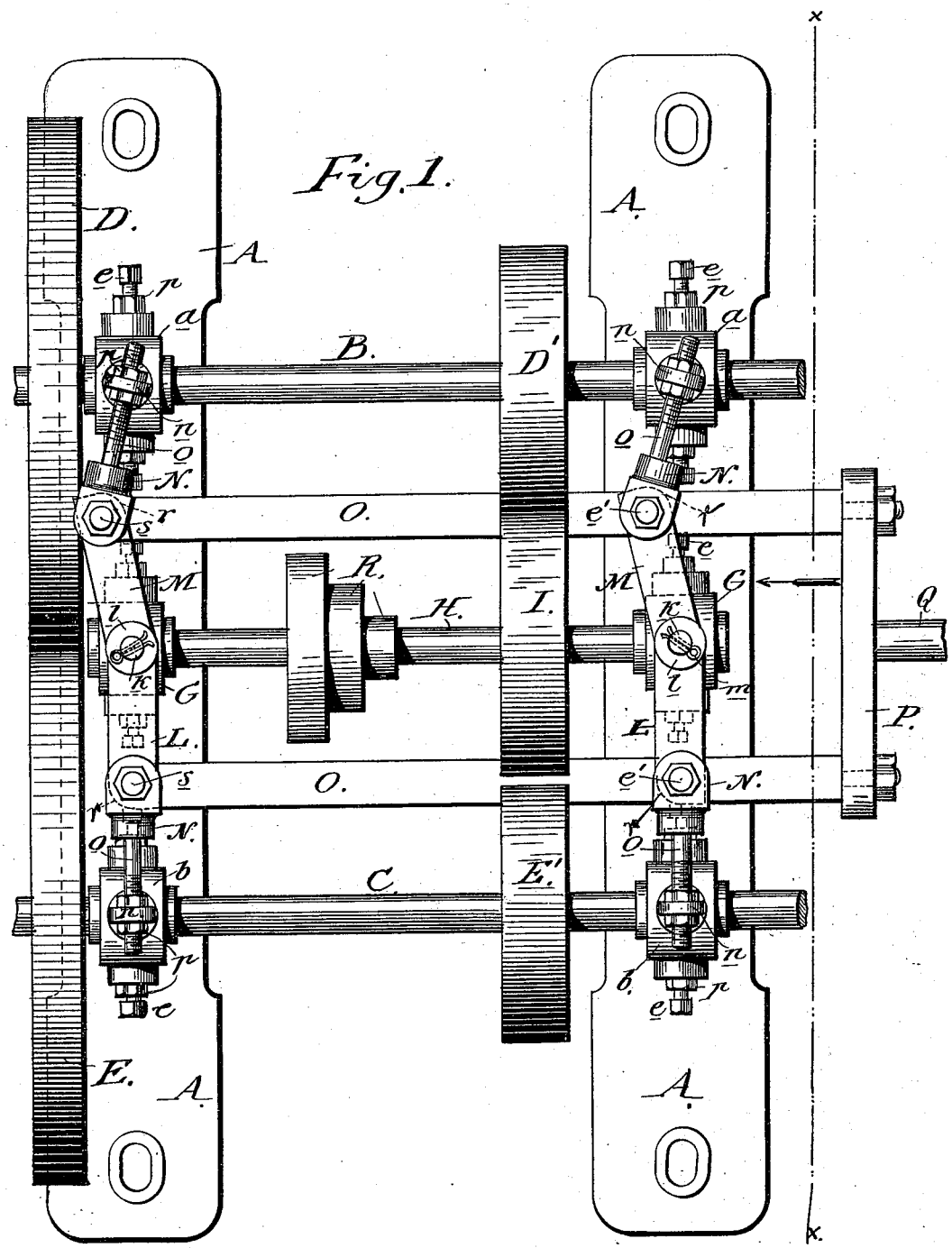

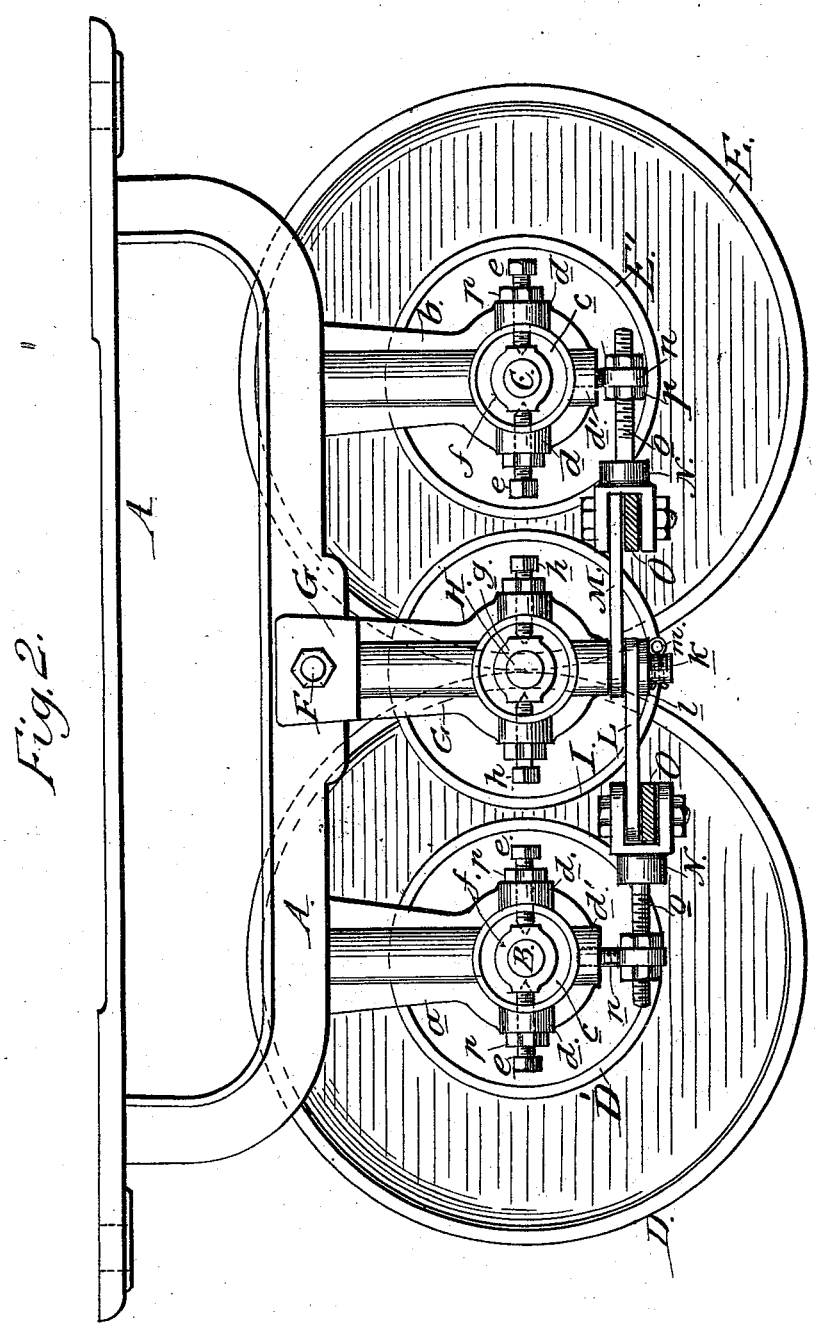

ALFRED A. FISHER AND WILLIAM G. NELSON, OF BROOKLYN, NEW YORK.

MECHANISM FOR TRANSMITTING POWER.

SPECIFICATION forming part of Letters Patent No. 511,415, dated December 26, 1893.

Application filed March 29, 1893. Serial No. 468,117. (No model.)

*To all whom it may concern:*

Be it known that we, ALFRED A. FISHER and WILLIAM G. NELSON, citizens of the United States, residing at Brooklyn, in the county of Kings and State of New York, have invented certain new and useful Improvements in Mechanism for Transmitting Power; and we do hereby declare the following to be a full, clear, and exact description of the invention, such as will enable others skilled in the art to which it appertains to make and use the same.

Our invention relates to mechanism for transmitting power from a driving to a driven portion, and it consists of the constructions and combinations of devices which we shall hereinafter fully described and claim.

The essential object of our invention is to provide a simple and positive mechanism for transmitting the motion and power of a driver to a mechanism, machine or part to be driven.

Figure 1, is a bottom plan view of a mechanism for transmitting power embodying our invention. Fig. 2, is a sectional view of the same on the line $x-x$ of Fig. 1.

Similar letters of reference indicate corresponding parts in both figures.

In the accompanying drawings we disclose a preferred form of mechanism for carrying out our invention, although the details and specific arrangement of the same may be modified to suit existing circumstances without departing from the spirit of our invention.

In said drawings A represents a support adapted to be suitably secured and to support the operative parts of our invention, the said support having at or near its ends the depending hangers $a$ and $b$ in which the parallel shafts B and C are mounted, and have fixed to them the large pulleys D and E and small pulleys D' E', the rims or flanges of the pulleys D and E being adapted to engage with sufficient frictional contact whereby motion given to one of the pulleys is transmitted to the other pulley to rotate it in a reverse direction and provide for a right and left motion.

The hangers $a$ and $b$ have central openings $c$, and internally-threaded bosses $d$ at their sides, and other bosses $d'$ at their lower ends, and within the central openings the shafts B and C are mounted, while within the side bosses $d$, screws $e$ are mounted with their inner ends seated within bearings or seats formed within a collar $f$, secured upon the shafts at points within the open center of the hangers. This arrangement enables us to adjust the shafts laterally whereby the rims or outer flanges of the pulleys D and E may be moved toward and from each other to increase or decrease the tension or frictional contact between them.

Midway between the end hangers and suspended upon a bolt F passing through the central portion of the main support A, is a rocking hanger G, having an open center through which a counter shaft H passes and is provided with a collar $g$ with seats for the side screws $h$, mounted in bosses and operating to adjust the shaft laterally to increase or decrease the frictional contact of the driving pulley I on said shaft with the rims or flanges of either of the contiguous pulleys D' and E', when the mechanism hereinafter described is operated to throw the driving pulley into engagement with either of the driven pulleys.

From the lower face of the suspended hanger G projects a stud $k$ which furnishes a fulcrum for suitable toggle-levers L and M, and below said levers are a washer $l$ and key $m$ whereby the levers are retained upon the stud.

In the lower faces of the end hangers $a$ and $b$ are secured lugs or eyes $n$, pierced to receive the outer threaded shanks or stems $o$ of the connecting arms N, the opposite ends of which are bifurcated to receive the outer ends of the toggle-levers L and M, the said threaded shanks or stems $o$ and the screws which adjust the tension of the pulleys D, E and I being provided with lock nuts $p$ whereby these parts are secured after adjustment.

The outer ends of the toggle-levers L and and M are so formed that one side presents a straight surface while the other face $r$ is rounded or curved, and the curved faces of the two levers are reversed with relation to each other; in other words the upper inner end of the lever L is rounded while the lower outer face of the lever M is also rounded, while the remaining faces of both levers are straight and square. The purpose of this specific construction will be presently disclosed. The bifurcated inner ends of the arms N also receive bars O whose ends are secured in one set of the toggle levers by the bolts s which secure the inner ends of the levers to the arms, said rods or bars O thence extending parallel with each other to the other set of levers and, after being secured to the latter by bolts e', they project beyond said second set of levers and have their outer ends connected by a cross bar P from the center of which projects a stud or arm Q to which any well known form of shifting rod (not shown) may be secured to effect the movement of the parallel rods or bars and the simultaneous throw of the toggle-levers.

The lugs or eyes n in which the threaded shanks or stems of the arms N are mounted, are adapted to form a swivel or loose connection with the end hangers whereby a universal joint is formed to enable the arms to oscillate to accommodate the throw or movement of the toggle-levers as shown in Fig. 1.

Upon the counter-shaft or driver is fixed a cone pulley R to which power is applied in any suitable manner to operate said shaft.

The operation of the mechanism previously described is substantially as follows: In the position shown in Fig. 2 the driving pulley is out of contact with the pulleys D' E' upon the shafts B and C; but if the parallel bars O be moved in the direction of the arrow, then the levers L are brought in line with their arms N, the levers M being thrown farther out of line with their sets of arms, and the hangers with the shaft H bearing pulley I are forced over bringing the pulley I in frictional contact with the pulley D' on shaft B, whereby motion is communicated from pulley I to pulley D'. A movement of the arms O in a reverse direction causes the pulley I to be brought into frictional contact with pulley E', and causes a rotation of the shafts B and C in an opposite direction to that caused by the pulley I being in contact with the pulley D'.

Having thus described our invention, what we claim as new, and desire to secure by Letters Patent, is—

1. In a mechanism for the transmission of power, depending hangers pivotally suspended midway between the devices to be driven and carrying a driver, toggle-levers pivotally mounted on the said hangers in pairs, the pivotally mounted arms to which the outer ends of the levers are connected, and paralled bars joining the levers and arms at their junction.

2. In a mechanism for the transmission of power the combination, with the driven pulleys and a driver located midway between the same, of suspended hangers carrying said driver, toggle-levers pivoted in pairs upon the hangers, adjustable and swiveled arms receiving the outer ends of the levers, and connections between each pair of levers for operating them in unison to move the driver into and out of contact with the driven pulleys, substantially as herein described.

3. The combination, with the shafts and pulleys of a driven mechanism, of a driver consisting of a shaft mounted in hangers and provided with a pulley, toggle-levers pivotally connected with each of said hangers, swiveled arms connecting the outer ends of the levers with a fixed support, and longitudinally movable parallel bars connecting the outer ends of the levers in pairs, whereby the levers and swiveled connecting arms are operated to move the suspended hangers in lateral planes and to cause the driving pulley to engage or disengage the driven pulleys.

4. In a mechanism for the transmission of power, the combination, with mechanism to be driven, and a driver comprising a shaft carrying a drive pulley, of pivotally-suspended hangers, of toggle-levers pivotally mounted at their inner ends upon each of said hangers in pairs, said levers having their outer ends provided with rounded or curved portions reversely disposed, swiveled arms for connecting the outer ends of the levers with a fixed support, and means for operating the levers.

5. The combination, with a mechanism to be driven, and a driver contiguous thereto and comprising a shaft mounted in hangers and pulleys mounted on said shaft, of the toggle-levers pivoted upon the hangers and having outer ends provided with straight and curved surfaces reversely disposed, the arms having bifurcated inner ends to receive said levers and provided with threaded stems whereby they may be adjusted, lugs or eyes swiveled contiguous to the outer ends of the stems and adapted to receive them, nuts upon said stems, and parallel bars connected with the ends of the levers and arms whereby the levers are operated to move the driver laterally into and out of contact with the mechanism to be driven.

6. The combination, with a mechanism to be driven comprising pulleys mounted upon independent shafts with their flanges or rims in contact with each other, of a driver interposed between said shafts, and means for adjusting the shafts toward and from each other to increase or decrease the frictional contact between the flanges or rims of the pulleys.

7. The combination of stationary hangers having open centers, parallel shafts mounted in said hangers and carrying pulleys whose flanges or rims rotate in contact with each other, screws upon each side of the hanger for adjusting the shafts toward and from each other to increase or decrease the frictional contact between the pulleys, and lock nuts for the screws.

8. The combination of parallel shafts having large and small pulleys, hangers for said shafts, and means for adjusting the shafts toward and from each other, a counter shaft with pulley interposed between the small pulleys on the parallel shafts, a suspended hanger for the counter-shaft, means for laterally adjusting the countershaft pulley, and toggle-levers and adjuncts for throwing the counter-shaft pulley into and out of frictional engagement with the contiguous pulleys on the parallel shafts.

In testimony whereof we affix our signatures in presence of two witnesses.

ALFRED A. FISHER.
WILLIAM G. NELSON.

Witnesses:
JNO. G. HUDSON,
T. HUBNER.